United States Patent Office 2,798,592
Patented July 9, 1957

2,798,592
BOOSTER DRIVE

Morris B. Uhrich, Glenside, and Kenneth F. Miller, Philadelphia, Pa., assignors to Link-Belt Company, a corporation of Illinois Application June 21, 1954, Serial No. 438,054

15 Claims. (Cl. 198—203)

This invention relates to new and useful improvements in conveyor drives and deals more particularly with caterpillar type drives employing pusher dogs for engaging an endless flexible driven device.

Various types of caterpillar drives have been used in the past for driving almost every type of endless conveyor, or similar device. Known types of caterpillar drives, however, have had certain inherent disadvantages, principally in the ways in which the pusher dogs became engaged with and disengaged from the driven device.

For example, one common type of caterpillar drive employs a drive chain, certain pitches of which are provided with integral or rigidly attached driving dogs. In an installation of this type, the driving dogs approach, or converge upon, the path of movement of the driven device in such manner that a substantial amount of clearance is necessary in back of each of the drive engaging faces of the driven member to permit tilting movement of the dogs into their proper driving positions. This clearance permitted some overrunning of the drive chain by the driven device so that the drive could not be intermittently operated to accurately position given portions of the driven device, or different objects carried thereby, at given stations along the path of movement of the driven device.

Another disadvantage in this type of drive is that the path of movement of the drive chain must diverge from the path of the driven device at the disengaging end of the drive so that the driving dogs are freed for movement around the sprocket. This divergence effects a slight tilting of the driving dogs relative to, and in the direction of movement of, the driven device so that the working faces of the dogs and the driven device are subjected to considerable wear, due to rubbing, as they are disengaged.

It is the primary object of this invention to provide a caterpillar type drive having members which are movable into driving engagement with and disengagement from a driven device in such a manner as to prevent relative rubbing engagement between the working faces of the drive member and the driven device.

A further important object of the invention is to provide a caterpillar type drive having members that are movable into mesh with the driven device in a manner which permits the driven device to be formed with a minimum clearance allowed for movement of the drive members into their meshed positions.

Another important object of the invention is to provide a reversible caterpillar type drive having members that are movable into and out of driving engagement with the driven device while the drive is traveling in either direction and substantially without rubbing engagement between the drive members and the driven device.

Still another object of the invention is to provide a reversible caterpillar type drive having members that are supported for engagement with a driven device to move the latter in either direction and which are so related as to prevent relative lineal, or overrunning, movement between the driving members and the driven device when the drive is stopped.

Other important objects and advantages of the invention will be apparent during the course of the following description.

In the accompanying drawings forming a part of this specification and in which like reference characters are employed to designate like parts throughout the same.

Figure 1:
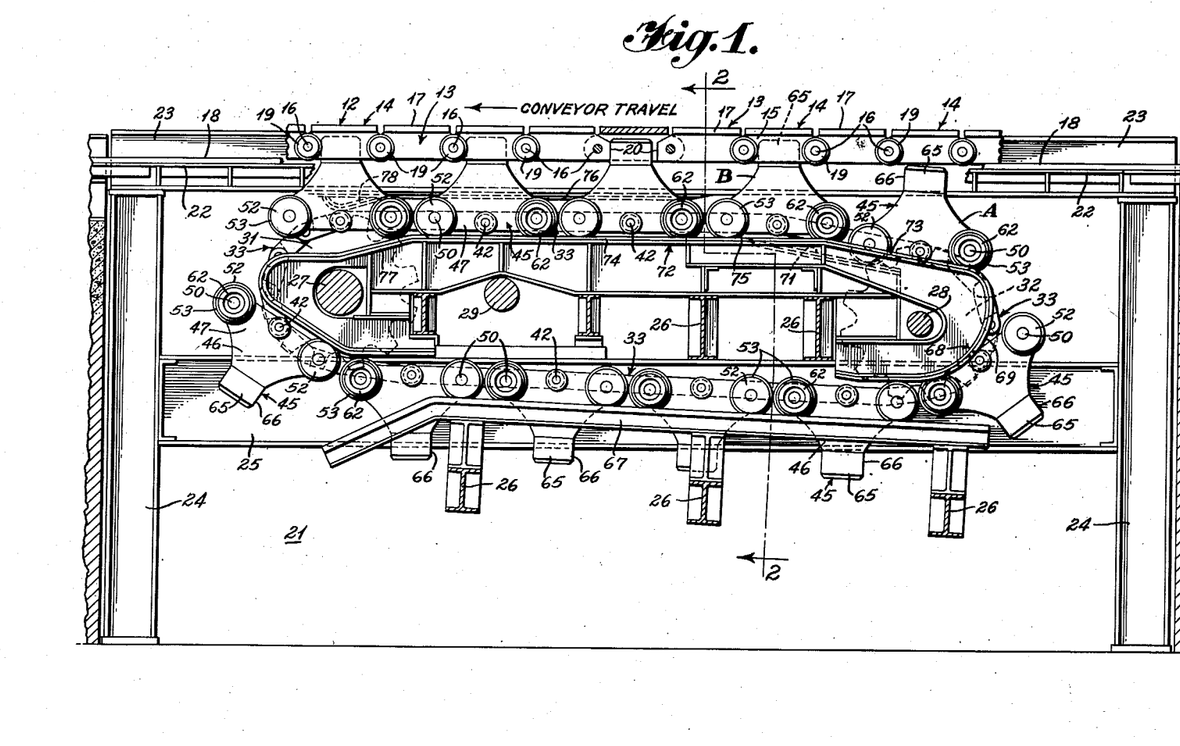
Figure 1 is a vertical sectional view on line 1—1 of Fig. 2 and showing a preferred embodiment of the invention.
Figure 2:
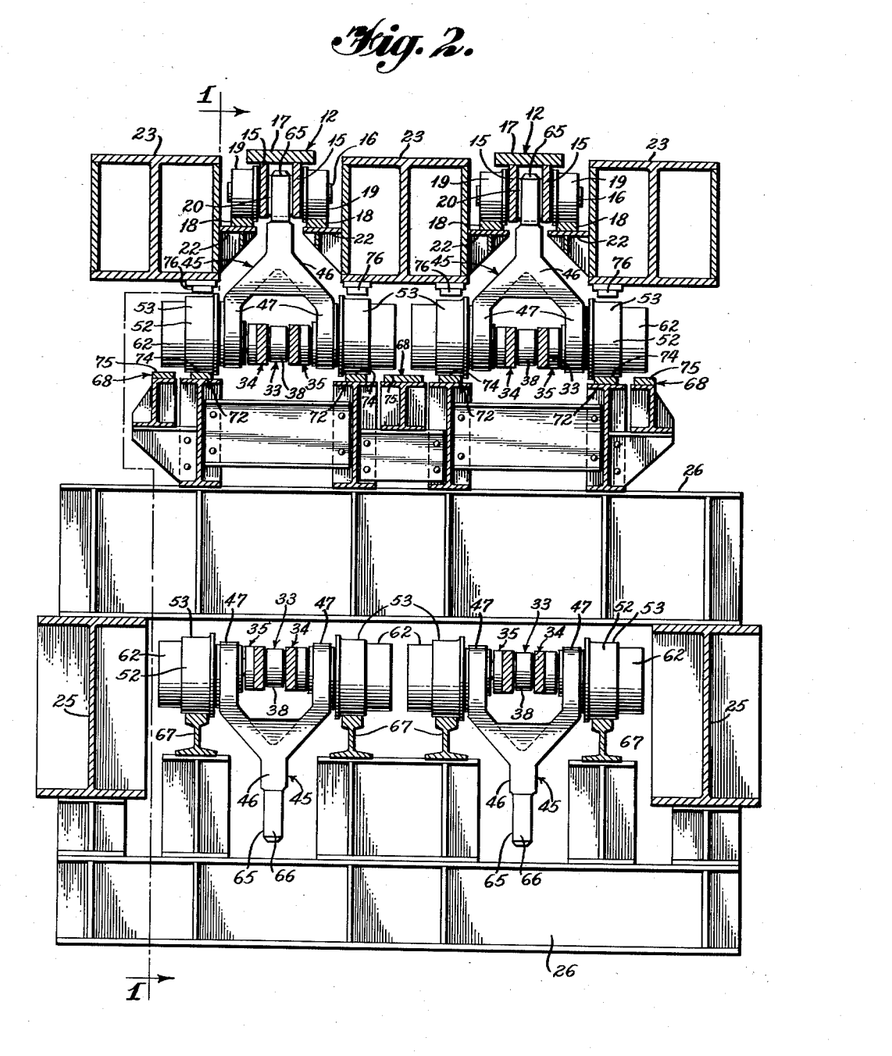
Figure 2 is a vertical sectional view taken on line 2—2 of Fig. 1.

In the drawings, wherein for the purpose of illustration are shown the preferred embodiments of this invention, and first particularly referring to Figs. 1 and 2, there is shown a caterpillar type drive for imparting movement to the parallel strands of a pallet type conveyor chain 12. It will be readily apparent that the drives for the two chains 12 will operate in perfect synchronization by reason of their being driven by a single drive shaft, and that in every other respect the operation of the drives and the cooperation with their associated chains 12 is identical so that only one of the drives will be described.

The chain 12 is formed of alternate inside and outside links 13 and 14, respectively, with the opposite end portions of each inside link 13 being positioned between the side bars 15 of its adjacent outside links 14 and being connected thereto by the chain pins 16 which pass through the overlapped end portions of the links. Each of the links 13 and 14 is provided with a top plate 17 upon which the conveyed load is carried and the chain is supported for movement on tracks 18 by flanged rollers 19 which are rotatably mounted on opposite ends of each chain pin 16.

It will be noted that a pocket is formed between the top plate 17 and side plates 15 of each outside link 14 and the end surfaces of the connected end portions of the inside links 13. The pocket provided by each outside link opens downwardly and the end surfaces of the adjacent inside links 13 provide drive surfaces 20 at each end of each pocket which are normal to the path of movement of the chain 12.

The rails 18 span the drive pit 21 on shelves 22 which are mounted on opposed sides of the laterally spaced girders 23. The girders 23 are supported at opposite ends of the pit 21 by columns 24.

Extending between and suitably connected to the columns 24 at opposite ends of the pit 21 are a pair of drive support beams 25 which are connected to each other by a number of transverse structural members 26 to provide a rigid drive base. Rotatably mounted in longitudinally spaced relationship on the beams 25 are a head shaft 27 and a tail shaft 28 for the caterpillar drive. The head shaft 27 is drivingly connected by any suitable means, not shown, to a drive shaft 29 that is also rotatably supported on the beams 25 and is actuated by any suitable type of prime mover.

A head sprocket 31 is rigidly connected to the head shaft 27 for rotation therewith in vertical alignment with its associated conveyor chain 12 and a tail sprocket 32 is mounted in a similar position on the tail shaft 28. It will be noted that the shaft 28 is positioned at a greater distance below the chain 12 than the shaft 27 so that the top dead center of the tail sprocket 32 is positioned a greater distance below the chain 12 than the top dead center of the head sprocket 31.

Figure 6:
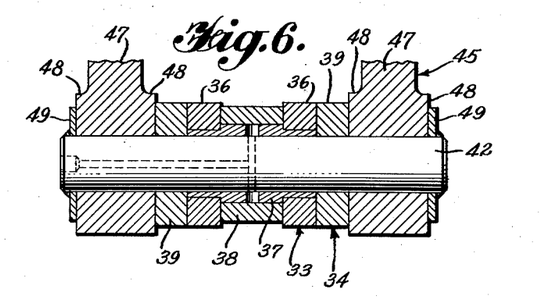
Figure 6 is a fragmentary sectional view taken on line 6—6 of Fig. 3.
Figure 9:
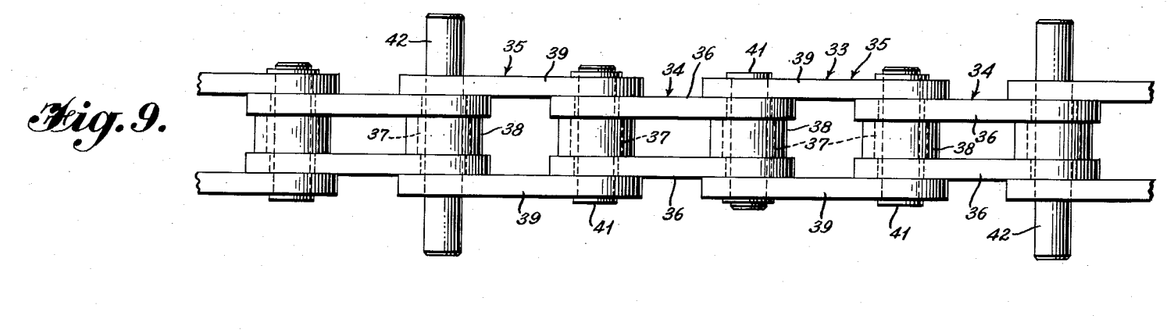
Figure 9 is an enlarged fragmentary view of the drive chain employed in the modifications of the inventions illustrated in Figs. 1 and 7.

Trained over the longitudinally aligned pair of head and tail sprockets 31 and 32, respectively, is a drive chain 33, the construction of which is best illustrated in Figs. 6 and 9. Referring first to Fig. 9, it will be noted that the chain 33 is formed of alternate inside and outside links 34 and 35, respectively. The inside links 34 are each formed of a pair of side bars 36 having pitch holes in their opposite end portions which are press fitted onto the shouldered end portions of bushings 37, as best illustrated in Fig. 6. Mounted on each bushing 37 between the side bars 36 is a roller 38 for engaging the teeth of the head and tail sprockets 31 and 32, respectively.

The outside links 35 are each also formed with a pair of side bars 39 having pitch holes in their opposite end portions which are aligned with the bores of the bushings 37 of the adjacent inner links 34 for receiving the chain pins 41 and 42 to pivotally connect the adjacent pitches of the chain. As illustrated in Fig. 9, adjacent groups of four links of the chain 33 are connected by the extended chain pins 42.

Figure 3:
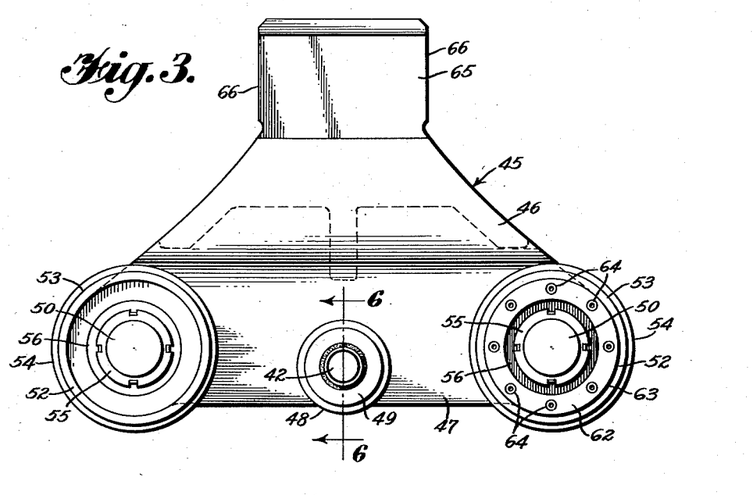
Figure 3 is a side elevational view of one of the pusher dogs employed in the device illustrated in Figs. 1 and 2.
Figure 4:
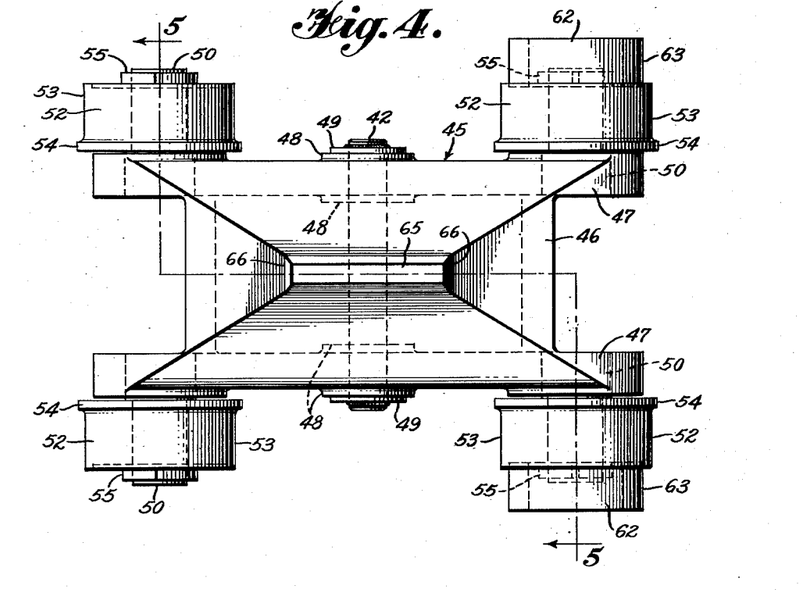
Figure 4 is a top plan view of the pusher dogs illustrated in Fig. 3.
Figure 5:
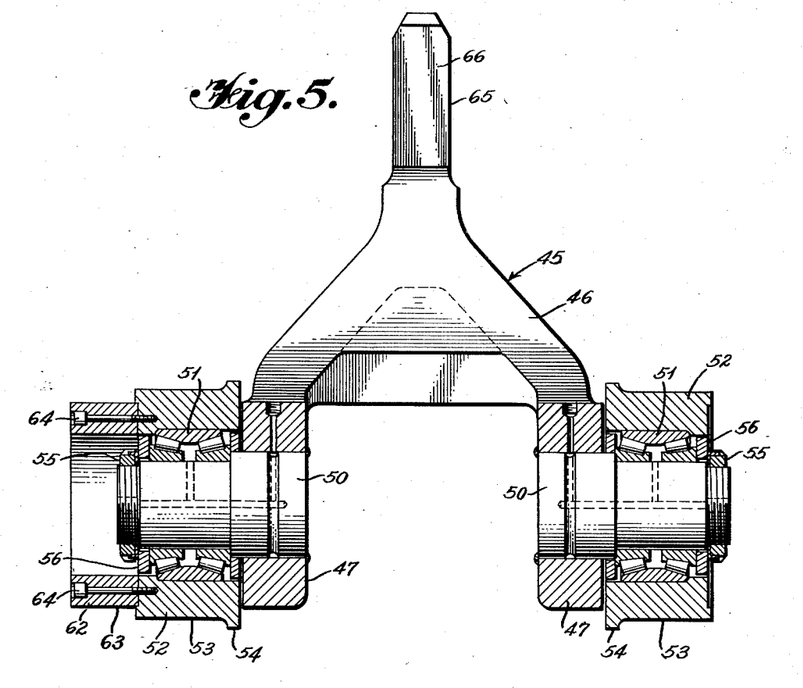
Figure 5 is a vertical sectional view taken on line 5—5 of Fig. 4.

Mounted on both of the extended ends of each chain pin 42 is a pusher dog 45, best illustrated in Figs. 3 to 5, inclusive. It will be noted at this point that the pitch of the chain 33 is exactly one-half that of the chain 12 so that the pusher dogs 45, mounted on the chain 33 at intervals of four pitches, will have the same uniform spacing as the drive pockets provided by the adjacently arranged outside links 14 of the chain 12.

Referring now to Figs. 3 to 6, inclusive, for a detail description of the pusher dogs 45, and the manner in which they are connected to the drive chain 33 by the extended chain pins 42, the body 46 of each pusher dog is formed with a pair of depending side plates 47 which are spaced to receive the chain 33 therebetween. As illustrated in Fig. 6, the side plates 47 have bosses 48 formed on their inner and outer surfaces at the midpoint of their lengths. Openings are formed through the bosses 48 and these are aligned with pitch holes in the side bars 39 of the outer links 34 and the bushings 37 of the inner links 33 that receive the extended chain pins 42. It will be noted that the inner bosses 48 lie closely adjacent to the outer surfaces of the side bars 39 to prevent lateral movement of the pusher dog 45 on the drive chain 33. Washers 49 are fitted over the ends of the pins 42 and are welded thereto to prevent lateral displacement of the pins.

Press fitted into aligned openings in the opposite end portions of the side plates 47 are the four stub axles 50. The inner ends of the axles 50 are flush with the inner surfaces of the side plates 47 and the outer end portions extend laterally outwardly from the pusher dog 45. Mounted on the outwardly extending portion of each stub axle 50 is an antifriction bearing unit 51 for rotatably mounting a supporting roll 52 on the stub axle. The inner edge portion of the roller surface 53 of each roll 52 is flanged outwardly at 54 to assist in guiding the pusher dogs 45 through a predetermined path, as will be later described. The antifriction bearing units 51 are retained on the stub axles 50 by locknuts 55 that are threaded onto the outer ends of the axles.

The rolls 52 at corresponding ends of each of the pusher dogs 45 are provided with coaxially arranged, annular extensions 62 having roller surfaces 63 of smaller diameter than those of the rolls 52 and extending laterally outwardly from the ends of the rolls 52. The extensions 62 are connected to their associated rolls 52 by a plurality of cap screws 64.

Extending radially outwardly from the body 46 of each pusher dog 45 is a drive tooth 65 which is centered longitudinally of the dog. The width and length of each tooth 65 is slightly less than that of the drive pockets in the chain 12 and a drive surface 66 is provided at each end of the tooth in normal relationship with the line of centers between the rolls 52. The upper edges of each tooth 65 are beveled to facilitate entry of the tooth into the drive pockets of the chain 12, as will be later described.

Referring once again to Figs. 1 and 2 for a detail description of the manner in which the pusher dogs 45 are supported for movement by the drive chain 33 between the head and tail sprockets 31 and 32, respectively, it will be seen that the dogs connected to the lower, or inactive, run of the drive chain are supported between the head and tail sprockets by a pair of spaced rails 67 which engage the rolls 52 of the pusher dogs 45. At the end portions of the rails 67 adjacent the head sprocket 31, the rails are inclined downwardly to engage the rolls 52 at the lead ends of the pusher dogs 45 to align the dogs for movement onto the supporting portions of the rails. It will be noted that the extensions 62 are mounted on the rolls 52 at the following ends of the dogs 45 and that the supporting portions of the rails 67 are slightly inclined in parallel relationship with the line of centers of the head and tail shafts 27 and 28, respectively, so that the chains 33 will be supported in substantially tangential alignment with the lower peripheries of the head and tail sprockets 31 and 32, respectively.

As the chain 33 moves into engagement with the tail sprocket 32, the annular extensions 62 of the rolls 52 at the following end of each pusher dog 45 are moved into positions at which the roller surfaces 63 of the extensions underlie laterally spaced rails 68. As the chain 33 continues its movement around the tail sprocket 32, the rolls 52 of the successive pusher dogs 45 are moved out of engagement with the rails 67 and the rails 68 are curved outwardly and upwardly relative to the sprocket 32 to provide camming surfaces 69 which, by their engagement with the roller surfaces 63 of the annular extensions 62, will cause the pusher dogs 45 to be swung into an approach position, as illustrated by the dog 45 designated by the reference character A in Fig. 1.

When successive ones of the dogs 45 are moved into the approach position A, the rolls 52 at the leading end of each dog will be engaged by the camming surfaces 71 of laterally spaced rails 72 and the annular extensions 62 will move onto the camming surfaces 73 of the rails 68. Since the lateral spacing of the rolls 52 is less than that of the extensions 62, the lateral spacing of the rails 72 will be less than that of the rails 68 so that the rolls 52 at the leading ends of the dogs 45 will pass downwardly between the camming surfaces 73 into engagement with their associated camming surfaces 71. It will be noted that camming surfaces 71 and 73 of the rails 72 and 68, respectively, are positioned in spaced parallel planes that are angularly arranged relative to the path of movement of the conveyor chains 12.

The engagement between the rolls 52 and the camming surfaces 71 and the extensions 62 and camming surfaces 73 will support the dogs for translational movement from their approach position A toward, and in angular relationship with, the path of movement of the chain 12. In other words, every portion of each pusher dog 45 that is supported for movement along the camming surfaces 71 and 73 is moving in the same direction and at the same velocity as every other portion of the dog. Due to the smaller diameter of the annular extensions 62 at the following end of each pusher dog 45, the dogs are supported on the camming surfaces 71 and 73 in slightly, rearwardly tilted relationship with the path of movement of the chain 12. The camming surfaces 71 and 73 support the pusher dogs during their movement from the approach position A to a position at which the drive teeth 66 have fully entered their associated pockets in the outside links 14 of the chain 12. This fully entered position is indicated at B in Fig. 1.

When the pusher dogs 45 have reached position B, the rolls 52 at the leading ends of the dogs and the annular extensions 62 at the following ends of the dogs move off of the inclined camming surfaces 71 and 73 and onto the supporting surfaces 74 and 75 of the rails 72 and 68, respectively. The supporting surfaces 74 and 75 are positioned in a common plane in parallel relationship with the path of movement of the chain 12. During the initial portion of their movement on the supporting surfaces 74 and 75, the pusher dogs 45 will remain in their slightly rearwardly tilted positions, as illustrated by the dog B, and there will be no driving engagement between the drive face 66 on the tooth 65 of the dog and the drive face at the forward end of the associatde pocket in the chain 12. When the pusher dogs 45, however, have move along the surfaces 74 and 75 to a position at which the rolls 52 at the following end of each dog engage the supporting surfaces 74, the annular extensions 62 will be lifted out of contact with the supporting surfaces 75 of the tracks 68 and the pusher dogs will be tilted forwardly into driving engagement with the chain 12.

After each dog 45 is moved into driving engagement with the chain 12, the rolls 52 associated with the dog move under hold-down rails 76 and are thereby confined between the rails 76 and the supporting surfaces 74 of the rails 72 to positively prevent any tilting of the dogs during their movement in parallel driving relationship with the chain 12. When, however, the dogs 45 are moved to a position at which their pivotal connection to the chain 33 is engaged by the head sprocket 31, the dogs are released from their driving engagement with the chain 12 by the downward inclination in the portions 77 of the rails 72. The downward inclination of the rail portions 77 permits the rolls 52 at the following ends of the dogs to move downwardly so that the dogs 45 are tilted rearwardly out of engagement with the chain 12 by cam tracks 78 which are laterally spaced to only engage the tops of the annular extensions 62. The teeth 65 of the dogs 45 are thereby completely freed from driving engagement with the chain 12 as the dogs are moved away from the path of movement of the chain 12 by movement of the drive chain 33 around the head sprocket 31. The rails 72 are continued from their downwardly inclined portions 77 to the periphery of a head sprocket 31 and then in a rearwardly and downwardly inclined direction to engage and guide the rolls 52 of the pusher dogs 45 into their proper positions for engaging the rails 67.

It will be appreciated that the above described movement of the pusher dogs 45 first into interfitting relationsip with the chain 12 and then into actual driving engagement with the drive surfaces of the pockets in the chain 12 will permit the use of pockets having relatively small clearance with the drive teeth 65 of the dogs so that overrunning of the drive by the chain 12 is substantially eliminated. Further, the tilting movement of the pusher dogs 45 into and out of driving engagement with the drive surfaces of the pockets in the chain 12 substantially eliminates any rubbing movement between the drive surfaces 66 of the teeth 65 and the pockets of the chain 12 so that wearing of the engaged surfaces is greatly reduced.

Figure 7:
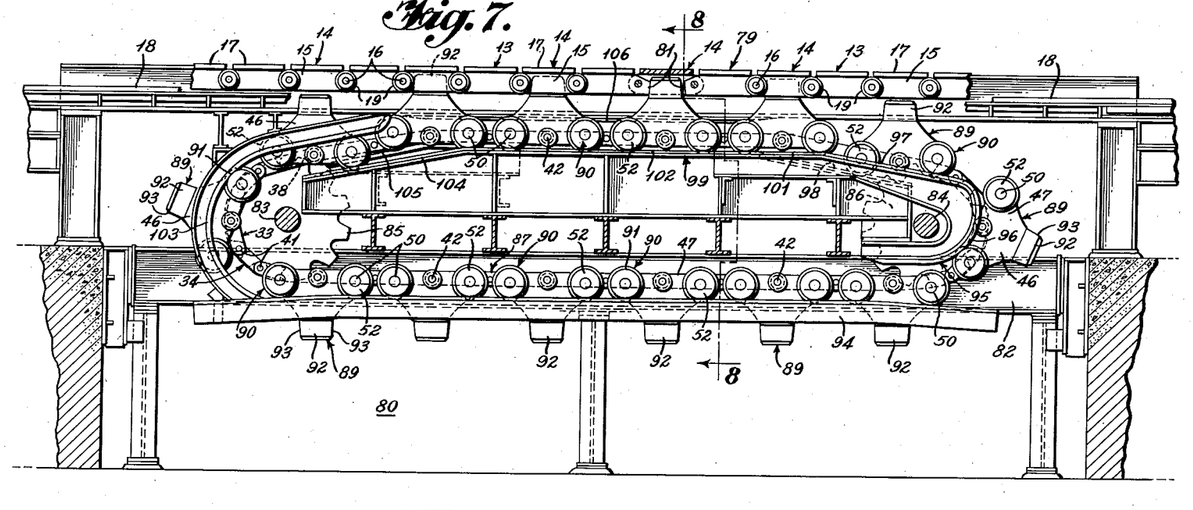
Figure 7 is a vertical sectional view taken on line 7—7 of Fig. 8, and showing a modified form of the invention.
Figure 8:
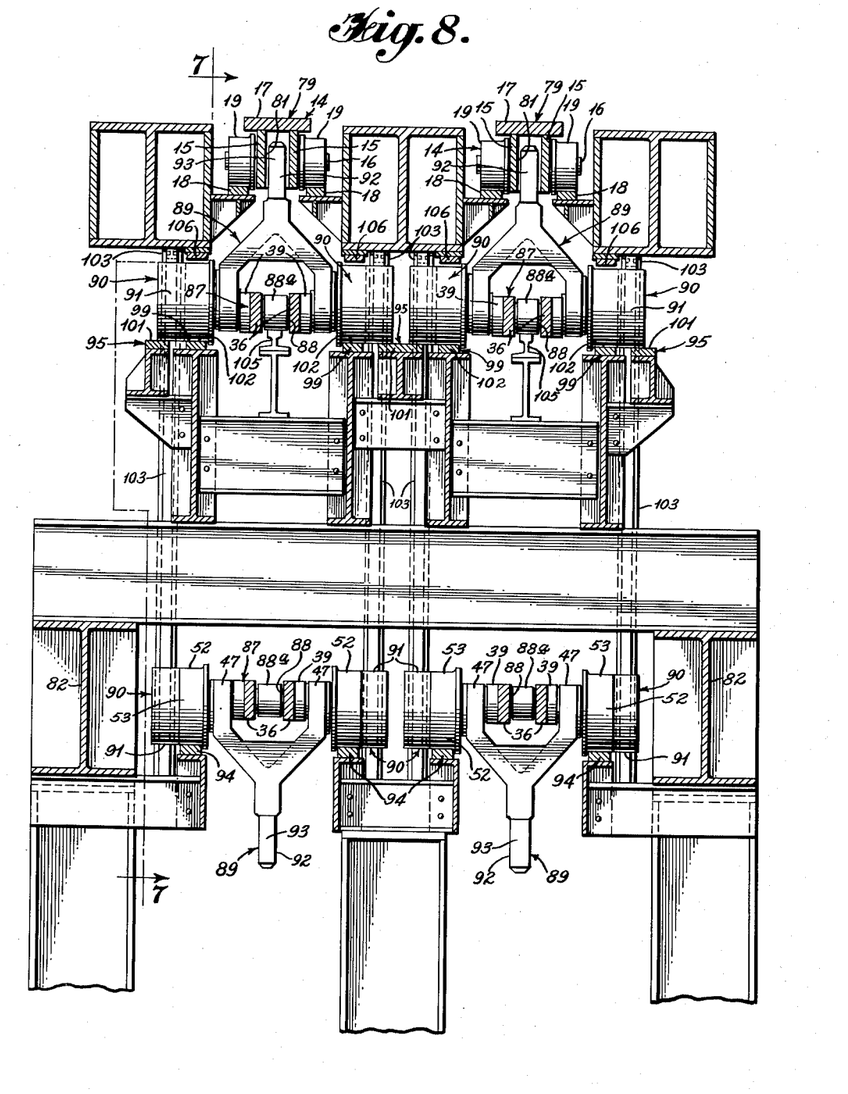
Figure 8 is a vertical sectional view taken on line 8—8 of Fig. 7.

Referring now to Figs. 7 to 11, inclusive, for a detail description of the modification of the invention illustrated therein, and first particularly referring to Figs. 7 and 8, it will be noted that the chains 79 of this modification are supported for movement across the drive pit 80 in substantially the same manner as the chain 12 of the previously described modification of the invention. The same reference characters have been applied to this supporting structure as were applied to the corresponding parts of the previously described structure and the structure will not be again described. Further, the conveyor chains 79 are identical with the chains 12 with the single exception that the end surfaces of the inside links 13, which form the drive surfaces 81 at the ends of the pockets in the outside links 14, are slightly inclined from the normal relative to the path of movement of the chains 79 so that the drive surfaces of the pockets converge slightly from the openings of the pockets toward the tops of the chains. The remaining reference characters applied to the chains 79 are the same as those applied to the corresponding portions of the chains 12. The purpose of the inclination of the drive surfaces 81 provided by the pockets in the chain 79 will be later described.

Mounted on a pair of longitudinally extending beams 82 in the drive pit 80 is a caterpillar type drive for the chains 79. The drive includes longitudinally spaced and laterally extending parallel shafts 83 and 84 which are rotatably supported on the beams 82 in any suitable manner and one of the shafts is driven by a conventional type of prime mover, not illustrated. A pair of laterally spaced sprockets 85 are mounted on the shaft 83 in vertical alignment with the chains 79 and a similar pair of sprockets 86 are mounted on the shaft 84 in alignment with the chains 79 and the sprockets 85. Trained over the longitudinally aligned pairs of sprockets 85 and 86 are drive chains 87 which are identical with the chains 33 except that the bushings 88 and the rollers 88a mounted thereon are of a greater length than those of the chains 33. The chains 33 were fully described in connection with the previously discussed modification of the invention and will not be described again. The same reference characters have been applied to the corresponding parts of chains 33 and 87.

Pusher dogs 89 are mounted on the chains 87 in the same manner and with the same uniform spacing as that of the previously described mounting of the pusher dogs 45 on the chains 33 and the pusher dogs 89 differ from the dogs 45 in only two respects, and the same reference characters have been applied to the corresponding parts of each.

Figure 10:
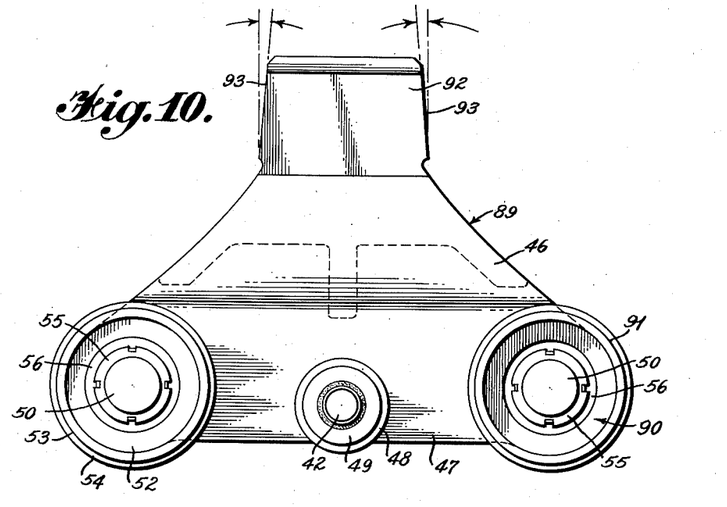
Figure 10 is a side elevational view of one of the pusher dogs employed in the modification of the invention illustrated in Fig. 7.
Figure 11:
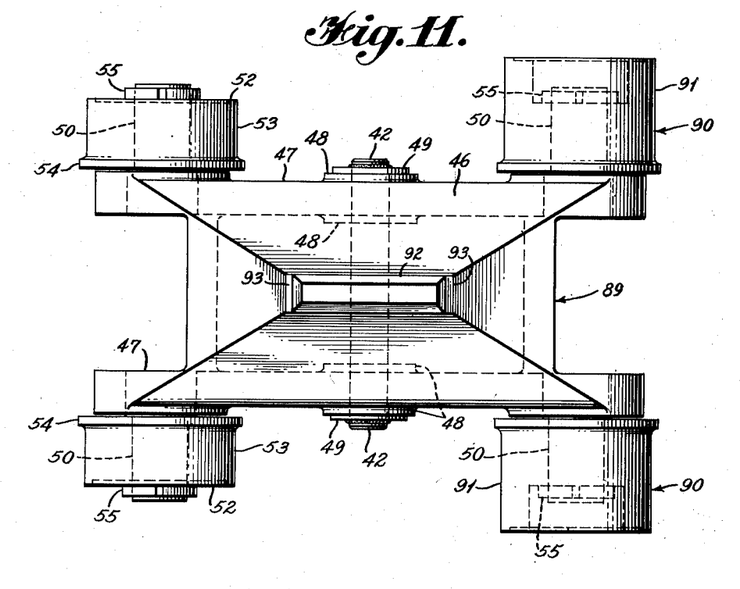
Figure 11 is a top plan view of the pusher dog illustrated in Fig. 10.

Referring now to Figs. 10 and 11 for a detail description of these modifications in the pusher dogs 89, it will be noted that one end of each pusher dog 89 has mounted thereon supporting rolls 90 having roller surfaces 91 of a constant diameter equal to that of the rolls 52 at the opposite end of the dog. The roller surfaces 91, however, are of a greater width than the surfaces 53 of the rolls 52 so as to provide surface portions in alignment with the rolls 52 and additional surface portions extending outwardly therefrom. The extended surface portions of the rolls 90, therefore, are longitudinally misaligned from the rolls 52.

The dogs 89 are further modified by the provision of drive teeth 92 having drive surfaces 93 at the opposite ends thereof which are inclined from the normal to the line of centers of the rolls of the dog at the same small angle as the drive surfaces 81 at the opposite ends of the pockets in the chains 79.

Referring once again to Figs. 7 and 8 for a detail description of the manner in which the pusher dogs 89 are supported for movement by the chains 87 between the sprockets 85 and 86 and into driving engagement with the chains 79, it will be noted that rails 94 are positioned below the lower peripheries of the sprockets 85 and 86 and are laterally spaced to engage the aligned portions of the roller surfaces 53 and 91 of the rolls at opposite ends of each dog 89. These rails 94, therefore, support the pusher dogs 89 and the attached chain 87 for movement in either direction between the sprockets 85 and 86. The end portions of the rails 94 adjacent the sprockets 85 and 86 are inclined downwardly to assist in engaging the rolls 52 and 90 of the dogs 89 as they move around the sprockets to guide the dogs into proper relationship with the supporting portions of the rails.

It will be noted at this point that the pusher dogs 89 are supported for movement in either direction around the sprockets 85 or 86 and into or out of engagement with the conveyor chains 79 in such a manner that the drive chains 87 may be driven in either direction to reverse the direction of movement of the conveyor chains. Since the movement of the pusher dogs 89 out of engagement with the chain 79 is exactly the converse of their movement into engagement with the chain 79, the following discussion will be limited to a description of the manner in which the dogs approach and drivingly engage the chain 79 from each of the sprockets 85 and 86. It should be understood that the disengagement of the dogs from the chain at either end of the drive will be a reversal of the described approach of the dogs to the chain from the opposite end of the drive.

Assuming first that the conveyor chains 79 are to be driven from right to left, as illustrated in Fig. 7, the dogs 89 will be moved along the rails 94 to approach the sprockets 86. When the dogs 89 are moving in this direction, the rolls 52 become the lead rolls and the rolls 90 are the following rolls.

As the pivotal connection of each dog 89 with the chain 87 moves into a position for engagement with the sprocket 86, the following rolls 90 of the dog are moved under a pair of rails 95 which are laterally spaced to overlie the outwardly extended or misaligned portions of the roller surfaces 91. Further movement of the dog 88 around the sprocket 86 will bring the extended surface portions of the rolls 90 into engagement with the curved sections 96 in the tracks 95 to cause the dogs to be tilted forwardly relative to the chain 87 as the pivotal connection of the dog reaches the top of the sprocket 86. At this point, the extended portions of the roller surfaces 91 of the rolls 90 will be moved into engagement with the inclined camming surfaces 97 of the tracks 95 and the lead rolls 53 of the dog 89 will pass downwardly between the camming surfaces 97 into engagement with the camming surfaces 98 of an inner pair of rails 99 which are laterally spaced to engage the rolls 53.

The camming surfaces 97 and 98 are arranged in spaced parallel planes and in angular relationship with the path of movement of the chain 79 so as to maintain the line of centers of the rolls 52 and 90 in parallel relationship with the path of movement of the conveyor chain 79 while the dog 89 approaches the chain. The camming surfaces 97 and 98, therefore, support the successive dogs 89 for translational movement into a position at which the forward inclined drive face 93 of the tooth 92 of each dog engages the drive face 81 at the opposed end of the pocket with which the drive tooth is meshed.

The slight inclination in the engaged drive faces 93 and 81 of the teeth 92 and the pockets of the chain 79 provides clearance for movement of the teeth 92 into meshed driving engagement with their associated pockets. More specifically, the movement of each dog 89 along the camming surfaces 97 and 98 is translational so that any given point on a dog traveling along the camming surfaces moves, relative to the corresponding point on the preceding dog, along an arcuate path that is centered at said corresponding point on the preceding dog. It follows, therefore, that a point on the upper margin on the drive face 93 of a tooth 92 can approach and engage the corresponding point on the upper margin of the drive face 81 of its associated pocket only if the lower portion of the drive face 81 lies entirely within the arcuate path of movement of the point. On the other hand, the angle of inclination of the engaged drive faces 81 and 93 cannot exceed the friction angle for the engaged surfaces or the driving force applied to the chain 79 might cause the chain to ride upwardly along the drive faces 93 of the teeth 92.

At the upper end portions of the camming surfaces 97 and 98, the rails 95 and 99, respectively, are extended in parallel relationship with the path of movement of the chain 79 to support the pusher dogs 89 for movement toward the sprocket 85 in driving engagement with the chain. The supporting surfaces 101 of the rails 95 are terminated at a point at which the rolls 90 have been moved into engagement with the supporting surfaces 102 of the rails 99 and the supporting surfaces 102 thereafter engage the aligned portions of both the rolls 52 and 90 to support the dogs through the remainder of their driving engagement with the chain 79. At the release end of the drive the pusher dogs 89 are moved out of driving engagement with the chain 79 in a manner that is the direct reverse of the approach of the pusher dogs to the chain 79 from the sprocket 85 as will be hereafter described.

Assuming now that the pusher dogs 89 are to be moved to drive the chain 79 in a direction from left to right, as illustrated in Fig. 7, the rolls 90 become the lead rolls and the rolls 52 are the following rolls. When the dogs 89 move along the rails 94 toward the sprocket 85 to a position at which the pivotal connection of the dogs to the chain 87 is engaged by the sprocket, the extended roller surfaces 91 of the rolls 90 are engaged by a pair of rails 103 which are laterally spaced to permit movement of the following rolls 52 therebetween. The rails 103 follow a curved path outwardly of the sprocket 85 and extend from adjacent the upper periphery of the sprocket 85 toward and in angular relationship with the path of movement of the chain 79. Engagement between the rolls 90 and the rails 103 causes the pusher dogs 89 to be pivoted into an upright position when the pivotal connection of the dog to the chain 87 reaches its point of disengagement from the sprocket 85.

Arranged in spaced parallel relationship with the angularly inclined portions of the rails 103 are a pair of rail portions 104, the upper end portions of which are connected directly to the supporting portions 102 of the rails 99. The spacing of the rail portions 104 and the angularly arranged portions of the rails 103 is such that the rolls 90 are confined therebetween. It will be noted, however, that the rail portions 104 are laterally spaced to engage only the portions of the roller surfaces 91 of the rolls 90 which are in longitudinal alignment with the following rolls 52.

Positioned between and in parallel relationship with the rail portions 104 is an inner rail 105 which is arranged in radial alignment with the sprocket 85. The upper surface of the rail 105 is in tangential alignment with the base circle of the teeth on the sprocket 85 so that the rollers 88a at each joint of the drive chain 87 will engage and be supported by the rail. The pusher dogs 89, therefore, are supported for translational movement from the sprocket 85 into meshed relationship with the pockets of the chains 79 by engagement of the rail 105 with the pivotal connection of the dog to the chain and by the confinement of the rolls 90 between the parallel track portions 103 and 104.

It will be noted that during the translational movement of each pusher dog 89 from the sprocket 85 into its meshed relationship with the chain 79, the following rolls 52 of the dog are entirely unsupported. This arrangement is necessary because the wider rolls 90 precede the rolls 52 along the path of movement of the dog 89 and would necessarily engage any supporting structure which was so spaced as to engage the rolls 52. The rolls 52, however, being narrower than the rolls 90 will pass freely between the spaced rails 103 so that the pusher dogs 89 may be properly oriented for movement into meshed relationship with the chain 79.

After the teeth 92 of the pusher dogs 89 have entered the pockets provided by the chain 79, the rolls 90 move upwardly along the rail portions 104 into positions between the supporting surfaces 102 of the rails 99 and the vertically spaced rails 106 which restrain vertical movement of the rolls 90. The following rolls 52 are thereafter moved into engagement with the supporting surfaces 102 of the rails 99. During this movement of the rolls 52 into engagement with the supporting surfaces 102, the pivotal connections of the dogs 89 to the drive chain 87 are supported on their associated rollers 88a by the center rail 105. The pusher dogs 89 are moved along the supporting surfaces 102 of the rails 99 in driving engagement with the chain 79 and are released from the chain 79 at the opposite end of the drive in a reverse manner from the previously described approach of the dogs from said opposite end of the drive.

It will be readily apparent that the drive illustrated in Figs. 7 and 8 is adapted for operation in either direction to reverse the movement of the conveyor chain 79 and permits the pusher dogs 89 to be moved into driving engagement with and disengagement from the chain conveyor 79 with a minimum of clearance between the teeth 92 of the dogs and the pockets of the chain. Further, there is a minimum of rubbing engagement between the drive surfaces 93 of the teeth and the surfaces 81 of the pockets of the chain.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, we claim:

1. In a drive mechanism, an endless flexible driven device having a plurality of uniformly spaced pockets therein providing drive surfaces, said driven device being movable through a straight path at the location at which it is to be driven, an endless drive chain, a pair of spaced sprockets over which the drive chain is trained, said sprockets being rotatable in a plane including said path of movement of the driven device, pusher dogs pivotally connected to said chain at points having the same uniform spacing as that of said pockets, a plurality of supporting rolls connected to each of said pusher dogs, said supporting rolls for each dog being divided between two positions spaced lengthwise of the dog, means separately engaging the longitudinally spaced rolls of each dog to support the dog for movement into one of said pockets of said driven device, said roll engaging means being spaced for guiding the movement of said rolls at said spaced positions through parallel paths to support said dog in fixed angular relationship with said driven device during the movement of said dog into said pocket, and means for engaging said rolls to support said dogs in driving engagement with the driven device through a portion of its said straight path.

2. A drive mechanism as defined in claim 1 further characterized by said roll engaging means comprising a set of guide rails, different ones of said rails having camming surfaces arranged in two parallel planes and in angular relationship with spaced points on the straight path of movement of the driven device for separately engaging the longitudinally spaced rolls of each dog to support the dog for translational movement from one of said sprocket wheels into one of the pockets of said driven device, certain of said rails also having supporting surfaces arranged in parallel relationship with said straight path of movement of the driven device for engaging said rolls to support the dogs in driving engagement with the driven device.

3. A drive mechanism as defined in claim 1 further characterized by each of said dogs having a drive tooth extending outwardly therefrom with the longitudinal and lateral dimensions of said teeth being less than the corresponding dimensions of said pockets, and the means for separately engaging the longitudinally spaced rolls of each dog being arranged to support the spaced rolls in parallel planes for movement of the dog in fixed angular relationship with the driven member to a position at which the tooth of the dog is located in an associated pocket of the driven member.

4. A drive mechanism as defined in claim 3 further characterized by the roll engaging means comprising a set of guide rails, different ones of said rails having camming surfaces arranged in two parallel planes and in angular relationship with spaced points on said path of movement of the driven device for separately engaging the longitudinally spaced rolls of each dog to support the dog for translational movement from one of said sprockets into a position at which the tooth of the dog is located in an associated pocket of said driven device, certain of said rails also having supporting surfaces arranged in parallel relationship with said path of movement of the driven device for engaging said rolls to support the dogs for movement with their drive teeth in driving engagement with the drive surfaces of the associated pockets of the driven device.

5. A drive mechanism as defined in claim 1 further characterized by said supporting rolls of each dog being arranged to provide two pairs of rolls that are spaced longitudinally of the dog, and said roll engaging means comprising a first pair of rails having camming surfaces arranged in a plane in angular relationship with said path of movement of the driven device for engaging one of said pairs of rolls, and a second pair of rails having camming surfaces arranged in a plane in spaced parallel relationship with said first mentioned plane for engaging the second pair of rolls, the camming surfaces of said first and second pairs of rails supporting the rolls of the dogs for translational movement of the latter into associated pockets of said driven device, one of said pairs of rails also having supporting surfaces arranged in parallel relationship with the path of movement of the driven device for engaging both of said pairs of rolls to support the associated dog in driving engagement with the driven device.

6. A drive mechanism as defined in claim 5 further characterized by the rolls of a first one of said pairs each providing a cylindrical surface that is spaced at a different lateral distance from the dog than the cylindrical surface provided by the corresponding roll of the second of said pairs, and said first and second pairs of rails having different lateral spacing for engaging the first and second pairs of rolls, respectively, to support the associated dog for translational movement into one of the pockets of said driven device.

7. A drive mechanism as defined in claim 6 further characterized by said first pair of rolls having inner portions of the same diameter as and in longitudinal alignment with the corresponding rolls of said second pair and outer portions of reduced diameter extending outwardly therefrom, and the rails being arranged to provide an inner and an outer pair with their camming surfaces engaging, respectively, the second pair of rolls and the outer portions of the first pair of rolls to support the associated dog for said translational movement, said inner and outer rails also having supporting surfaces arranged in a single plane in parallel relationship with the path of movement of the driven device, the supporting surfaces of the outer rails engaging the outer portions of said first pair of rolls for movement of the latter to a position at which the inner portions of the first pair of rolls engage the supporting surfaces of the inner pair of rails to effect pivotal movement of the dog into driving engagement with the driven device, said inner pair of rails supporting the dogs associated with the supporting surfaces thereof in driving engagement with the driven device.

8. A drive mechanism as defined in claim 7 further characterized by said second pair of rolls being mounted in leading relationship with the pivotal connection of the chain and dog in the direction of movement of the chain and the first pair of rolls in following relationship, said inner pair of guide rails having their camming surfaces arranged to converge uniformly from points adjacent one of said drive chain sprockets toward and in the direction of movement of the driven device and also having their supporting surfaces terminating in spaced relationship with the other of said drive chain sprockets to release the dogs from driving engagement before they are moved away from said path of movement by said drive chain, and said outer guide rails having their camming surfaces spaced from the camming surfaces of the inner rails to support the dogs for translational movement in a slightly rearwardly tilted position relative to their drive position, the supporting surfaces of said outer rails engaging the outer portions of the following rolls to support the dogs in their rearwardly tilted positions until the inner portions of the following rolls engage the supporting surfaces of the inner rails and tilt the dogs forwardly into driving engagement with the driven device.

9. A drive mechanism as defined in claim 5 further characterized by the supporting rolls of each pair having roller surfaces of the same diameter and the rolls of one of said pairs having wider roller surfaces than the rolls of the second of said pairs, the camming surfaces of said first pair of rails engaging the narrower roller surfaces of said second pair of rolls and the camming surfaces of said second pair of rails engaging the wider roller surfaces of said one pair of rolls only to support the rolls of an associated dog for said translational movement.

10. A drive mechanism as defined in claim 9 further characterized by the wider roller surfaces of said one pair of rolls providing longitudinally aligned and longitudinally misaligned roller surface portions for each of said dogs, the camming surfaces of said first and second pairs of rails engaging, respectively, the misaligned surface portions of the rolls of each dog to support the dog for said translational movement, the supporting surfaces of said first pair of rails engaging the aligned surfaces of said pairs of rolls to support the associated dog for movement in driving engagement with the driven device, and the supporting surfaces of the second pair of rails engaging the misaligned surface portions of the wider rolls during movement of the latter onto said first mentioned supporting surfaces.

11. In a drive mechanism, an endless flexible driven device having a plurality of uniformly spaced pockets therein providing drive surfaces, said driven device being movable through a straight path at the location at which it is to be driven, an endless drive chain, a pair of spaced sprockets over which the drive chain is trained, said sprockets being rotatable in a plane including said path of movement of the driven device, pusher dogs pivotally connected to said chain at points having the same uniform spacing as that of said pockets, an inner supporting roll connected to each of said dogs for rotation about the axis of its pivotal connection to the chain, a plurality of outer supporting rolls rotatably mounted on opposite sides of each of said dogs in longitudinally spaced relationship with its pivotal connection, a center guide rail having a camming surface arranged in angular relationship with the path of movement of the driven device for engaging the center rolls to support the dogs for movement into meshed relationship with the associated pockets of the driven device, and a set of outside guide rails having camming surfaces arranged in spaced planes parallel with the camming surface of said center guide rail for confining certain of said outer rolls therebetween during movement of the associated dogs into the pockets of the driven device, certain of said outside rails also having supporting surfaces in parallel relationship with the path of movement of the driven device for engaging said outer rolls to support the associated dogs for movement in driving engagement with said driven device.

12. A drive mechanism as defined in claim 11 further characterized by said outer supporting rolls being arranged in two pairs, the camming surface of said center guide rail extending in a substantially tangential direction from a point adjacent one of said sprockets toward and in angular relationship with the path of movement of the driven device, and said set of outside guide rails comprising two pairs of rails for confining one of said pairs of outer rolls of each dog therebetween to guide the dog into said meshed relationship, one of said pairs of outside rails having supporting surfaces in parallel relationship with the path of movement of the driven device for engaging both pairs of outer rolls of each dog to support the latter in driving engagement with the driven device.

13. In a drive mechanism, an endless flexible driven device having a plurality of uniformly spaced pockets therein providing drive surfaces, said driven device being movable through a straight path at the location at which it is to be driven, an endless drive chain, a pair of spaced sprockets over which the drive chain is trained, said sprockets being rotatable in a plane including said path of movement of the driven device, pusher dogs pivotally connected to said chain at points having the same uniform spacing as that of said pockets, said pusher dogs having drive surfaces for engaging the drive surfaces of said pockets, a plurality of supporting rolls connected to each of said pusher dogs, said rolls for each dog being divided between two positions spaced lengthwise of the dog, means separately engaging the longitudinally spaced rolls of each dog to support the dog for translational movement along a path at an acute angle with the straight path of said driven device, the drive surfaces of said pockets and the drive surfaces of said dogs during the translational movement of the latter being arranged at the same small angles with the normal to said straight path to provide clearance for movement of the drive surface of each dog into driving engagement with the drive surface of an associated pocket in the driven device by said translational movement, and means for engaging said rolls to support said dogs with their drive surfaces in driving engagement with the drive surfaces of the associated pockets through a portion of said straight path.

14. A drive mechanism as defined in claim 13 further characterized by said means for separately engaging the longitudinally spaced rolls of each dog being arranged to support the dog for translational movement between each of said sprockets and the straight path of said driven device, and the cooperating drive surfaces of said pockets and said dogs during translational movement of the latter being inclined from the normal to said straight path in the direction of relative movement between the surfaces to provide clearance for movement of the cooperating surfaces into and out of driving engagement by said translational movement of the dogs between the sprockets and the straight path.

15. A drive mechanism as defined in claim 14 further characterized by said pockets being formed to provide drive surfaces at each end thereof which are oppositely inclined from the normal to the path of movement of the driven device to converge inwardly from the pocket openings, said sprockets being alternately movable in opposite directions to reverse the direction of movement of the drive chain, and said pusher dogs having teeth providing drive surfaces on each end thereof which converge outwardly from the dog at the same angle of convergence as that of the drive surfaces of said pockets.

References Cited in the file of this patent

UNITED STATES PATENTS

| | | |
|---|---|---|
| 1,960,719 | Stibbs | May 29, 1934 |
| 2,609,086 | McBride et al. | Sept. 2, 1952 |